March 3, 1931.   C. D. AINSWORTH   1,794,750
ELECTRIC WIRING CONDUIT
Filed March 30, 1927
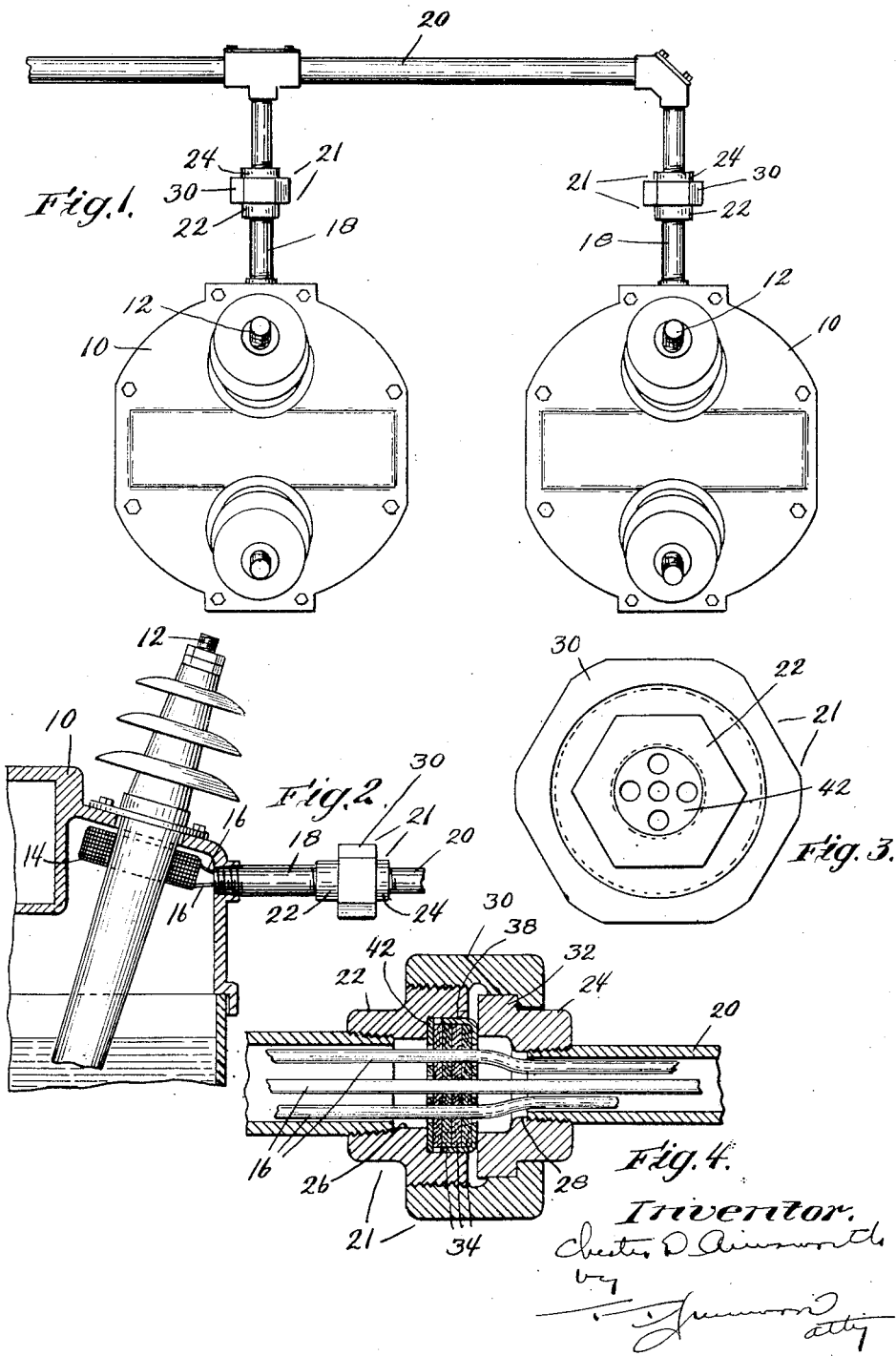
Inventor.
Chester D. Ainsworth Patented Mar. 3, 1931

1,794,750

UNITED STATES PATENT OFFICE

CHESTER D. AINSWORTH, OF WOLLASTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

ELECTRIC-WIRING CONDUIT

Application filed March 30, 1927. Serial No. 179,501.

This invention relates to electric wiring conduits especially adapted although not necessarily limited to association with oil filled electric switches to conduct the transformer or other low-tension leads into and out of the switch casings and has for an object the provision of means to prevent the flow of pressure fluid as gas therein or from one section to another of the conduit.

A further object is generally to improve the construction of electric wiring conduits.

Fig. 1 is a plan view of the electric wiring conduit embodying the invention associated with two oil immersed enclosed electric switches.

Fig. 2 is a sectional detail of one of the switches of Fig. 1 at an insulator thereof.

Fig. 3 is an end view of a conduit coupling embodying the invention.

Fig. 4 is a vertical section of the coupling of Fig. 3.

The invention is here shown as applied to a pair of oil immersed switches having the casings 10, insulated switch terminals 12, and transformer secondaries 14 which are disposed within the switch casings and have leads 16 that are brought out through conduits 18 in communication with the interior of the casing, which conduits are connected with a common conduit 20 through which the terminal leads of the transformers are extended in a more or less common manner.

When an oil immersed electric switch is opened under severe load oil gases and vapors may be generated under considerable pressure by the circuit interrupting arc; and under certain conditions an explosive mixture may form in the switch and explode. Under some conditions the pressure gases or the hot products of combustion in one switch casing may pass through the conduits 18 and 20 into an adjacent switch casing and either ignite the mixture therein or cause undesirable pressure disturbances. The pressure gases may also pass through the conduits into control boxes and create trouble therein.

Consequently, it is a purpose of this invention to provide means interposed in the electrical wiring conduits to prevent the flow of gas along the conduits while at the same time providing means for the passage of the conductors through the conduit. This purpose is accomplished by the provisions of gas-sealing couplings 21 preferably interposed between the conduits 18 and 20. The construction of the coupling is shown in Figs. 3 and 4 as comprising two coupling members 22 and 24 having internally screw-threaded aligned passages 26 and 28 therein into which the sections of the conduits 18 and 20 are screw-threaded. The member 22 is exteriorly screw-threaded and has a nut 30 thereon which engages the outstanding flange or shoulder 32 of the other member 24 to draw and hold the members together. The electric wires are passed through said coupling members and through packing means which is adapted closely to engage the wires and form a gas tight connection therewith and thus seal and isolate the conduit-sections. The coupling means comprises a series of compressible washers or discs 34 which are provided with spaced and aligned holes through which the wires 16 snugly fit. The washers are received in a metal cup 38 which has apertures therein through which the wires are passed which apertures are aligned with the apertures in the washers; and the washers and cup are received in an annular recess of the coupling member 22. A stiff metal pressure plate 42 is disposed over the stack of washers in the cup and has apertures therein aligned with the apertures in the washers and cup through which the wires are closely passed. The washers are compressed into gas-tight engagement with the wires 16 by the nut 30 which serves to press the coupling member 24 against the cup 38 and to squeeze the packing washers together and hold them releasably in the aforesaid relation. Preferably one of the conduit sections is larger than the other so that the wires can be separated a convenient distance apart at the packing washers.

As thus arranged, the flow of gas through the conduits 18 is prevented, thereby preventing the communication of trouble between switches or conduit-sections. The arrangement also prevents damage to the insulation of the wires in the conduit that might otherwise be occasioned by heated gases or oil vapors flowing along or occupying the conduits. Preferably the couplings 21 are located as close to the switches or to the entrances of the conduit as is practicable.

I claim:

1. A fluid tight coupling for an electric wiring conduit having a pair of opposed coupling sections provided with passages therethrough for the electric wires, a metal cup disposed between said sections having a fluid-tight seat on one of the said sections and also having a plurality of wire passages in its bottom wall, a metal plate disposed in front of said cup and engaged by said other section and having a plurality of similar wire passages therein, a stack of discs of compressible packing material received within said cup beneath said cover plate and having a plurality of wire passages therein aligned with the passages in said plate and cup, and means to draw said coupling members together and compress said stack of packing discs within the confines of said cup and also to press said cup into fluid-tight engagement with its seat on said coupling section.

2. A coupling for an electric wiring conduit comprising a pair of opposed coupling members having aligned wire-passages therethrough, a rigid metal cup located within said coupling and having a fluid tight seat on one of said coupling members, said cup having a bottom wall provided with separated passages therethrough through which separate wires can pass and a cylindrical side wall, a compressible packing located within said cup against said bottom wall and confined within said side wall and having a plurality of passages therethrough each aligned with a separate wire passage in said bottom wall of said cup and each adapted closely to receive a separate wire, a rigid metal plate bearing upon said packing having separate wire passages therethrough which register with the wire passages of said packing, and means to force said cup and plate toward each other and to expand said packing against the side wall of said cup and to contract the cross-sectional area of the passages in said packing.

In testimony whereof, I have signed my name to this specification.

CHESTER D. AINSWORTH.